UNITED STATES PATENT OFFICE.

IVAN GUBELMANN, HENRY J. WEILAND, AND OTTO STALLMANN, OF SOUTH MILWAUKEE, WISCONSIN, ASSIGNORS TO THE NEWPORT COMPANY, A CORPORATION OF DELAWARE.

3'-NITRO-4',6'-DICHLORO-ORTHO-BENZOYL-BENZOIC ACID AND PROCESS OF MAKING THE SAME.

No Drawing.   Application filed March 26, 1927.   Serial No. 178,809.

This invention relates to 3'-amino-4',6'-dichloro-ortho-benzoyl-benzoic acid and to a process for making the same.

It is an object of this invention to prepare 3'-amino-4',6'-dichloro-ortho-benzoyl-benzoic acid in a simple and economical way, both because of the importance of the compound itself and more especially because of its value as a starting material for the synthesis of valuable dyestuff intermediates.

Other and further important objects of this invention will become more apparent from the following description and the appended claims.

We have discovered that 3'-nitro-4',6'-dichloro-ortho-benzoyl-benzoic acid can be reduced under certain conditions to 3'-amino-4',6'-dichloro-ortho-benzoyl-benzoic acid. The reaction is most probably best expressed by the following chemical equation:

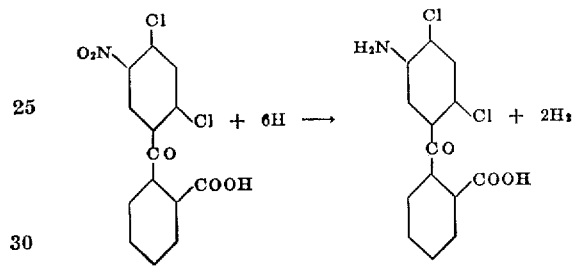

The method employed comprises reducing the nitro compound with iron powder and acetic acid. Although this reduction can be carried out by other reducing agents such as electrolytic hydrogen, by hydrogen and a catalyst, iron and hydrochloric acid, and the like, we prefer the use of iron and acetic acid for economic reasons.

3'-amino-4',6'-dichloro-ortho-benzoyl-benzoic acid is a light yellow powder, slightly soluble in hot water but practically insoluble in cold water. It is very soluble in alcohol, glacial acetic acid and in dilute caustic soda, sodium carbonate and ammonia solutions. It is practically insoluble in cold benzene or chloroform. It dissolves in concentrated sulphuric acid, imparting a yellow color to the solution. The free acid after repeated recrystallizations from hot water has a melting point of 164° C.

Without limiting our invention to any particular procedure, the following example illustrates our preferred method of preparation.

Example: Into a flask equipped with an agitator are charged 2000 parts of hot water, 400 parts of powdered iron and 32 parts of acetic acid. This mixture is then heated to 90–95° C. and there is added to it a paste previously prepared from 1400 parts of water and 340 parts of 3'-nitro-4',6'-dichloro-ortho-benzoyl-benzoic acid, maintaining at all times a temperature of 90–95° C. in the reduction mass. At the finish of the reduction reaction, there is added a solution consisting of 102 parts of sodium carbonate dissolved in 400 parts of water. The iron sludge is removed from the reduction mass by filtration. The filtrate containing the sodium salt of the final product is charged into a mixture consisting of 256 parts of 20° Bé. hydrochloric acid and 1000 parts of ice. After stirring the precipitated product for two hours, it is filtered off and dried. The melting point of the purified 3'-amino-4',6'-dichloro ortho-benzoyl-benzoic acid is 164° C.

We are aware that many changes may be made, and numerous details of the process may be varied through a wide range without departing from the principles of this invention, and we therefore do not purpose limiting the patent granted hereon, otherwise than necessitated by the prior art.

We claim as our invention:

1. As a new article of manufacture, 3'-amino-4',6'-dichloro-ortho-benzoyl-benzoic acid having the following chemical constitution:

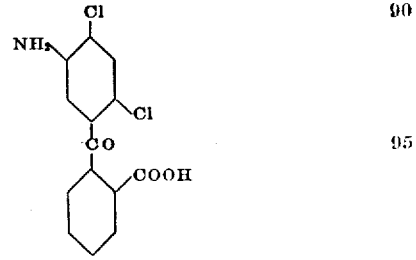

2. The process of preparing 3'-amino-4',6'- dichloro ortho benzoyl benzoic acid which comprises reducing 3'-nitro 4',6'-dichloro ortho benzoyl benzoic acid by means of iron and acetic acid at a temperature of 90 to 95° C., rendering the reaction mass alkaline, filtering to remove the iron sludge and acidifying the filter at a low temperature to precipitate 3'-amino 4',6'-dichloro ortho benzoyl benzoic acid.

In testimony whereof we have hereunto subscribed our names.

IVAN GUBELMANN.
HENRY J. WEILAND.
OTTO STALLMANN.

CERTIFICATE OF CORRECTION.

Patent No. 1,711,146.  Granted April 30, 1929, to

IVAN GUBELMANN ET AL.

It is hereby certified that error appears in the above numbered patent requiring correction as follows: In the heading to the printed specification, line 5, in the title of invention for the word "Nitro" read "Amino; and that the said Letters Patent should be read with this correction therein that the same may conform to the record of the case in the Patent Office.

Signed and sealed this 29th day of April, A. D. 1930.

(Seal)

M. J. Moore,
Acting Commissioner of Patents.

dichloro ortho benzoyl benzoic acid which comprises reducing 3'-nitro 4',6'-dichloro ortho benzoyl benzoic acid by means of iron and acetic acid at a temperature of 90 to 95° C., rendering the reaction mass alkaline, filtering to remove the iron sludge and acidifying the filter at a low temperature to precipitate 3'-amino 4',6'-dichloro ortho benzoyl benzoic acid.

In testimony whereof we have hereunto subscribed our names.

IVAN GUBELMANN.
HENRY J. WEILAND.
OTTO STALLMANN.

CERTIFICATE OF CORRECTION.

Patent No. 1,711,146.  Granted April 30, 1929, to

IVAN GUBELMANN ET AL.

It is hereby certified that error appears in the above numbered patent requiring correction as follows: In the heading to the printed specification, line 5, in the title of invention for the word "Nitro" read "Amino; and that the said Letters Patent should be read with this correction therein that the same may conform to the record of the case in the Patent Office.

Signed and sealed this 29th day of April, A. D. 1930.

(Seal)

M. J. Moore,
Acting Commissioner of Patents.